(No Model.)

T. J. LINDSAY & W. J. MINER.
CORN PLANTER.

No. 262,439. Patented Aug. 8, 1882.

WITNESSES:
Theo. J. Hosmer
C. Sedgwick

INVENTOR:
T. J. Lindsay
W. J. Miner
BY
Munn & Co.
ATTORNEYS.

N. PETERS. Photo-Lithographer, Washington, D. C.

UNITED STATES PATENT OFFICE.

THOMAS J. LINDSAY AND WILLIAM J. MINER, OF WINDFALL, INDIANA.

CORN-PLANTER.

SPECIFICATION forming part of Letters Patent No. 262,439, dated August 8, 1882.

Application filed December 21, 1881. (No model.)

*To all whom it may concern:*

Be it known that we, THOMAS JEFFERSON LINDSAY and WILLIAM JEFFERSON MINER, of Windfall, in the county of Tipton and State of Indiana, have invented a new and useful Improvement in Corn-Planters, of which the following is a full, clear, and exact description.

Figure 1:
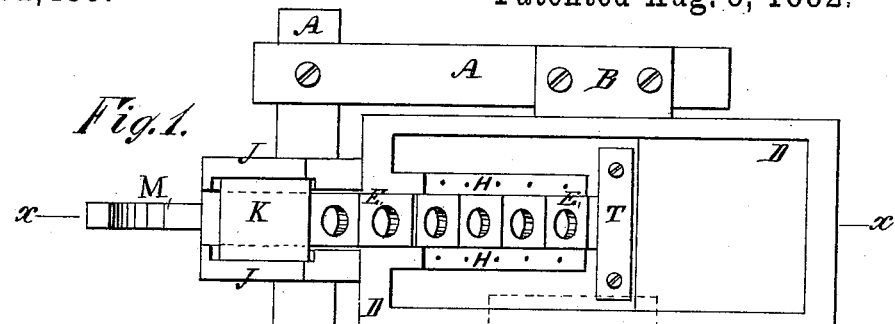
Figure 3:
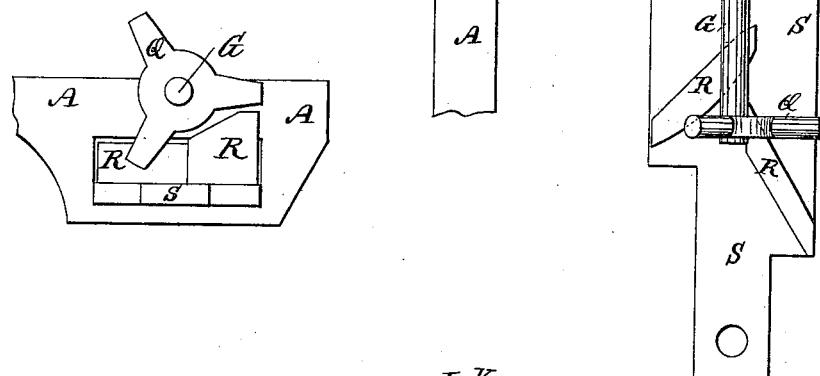
Figure 2:
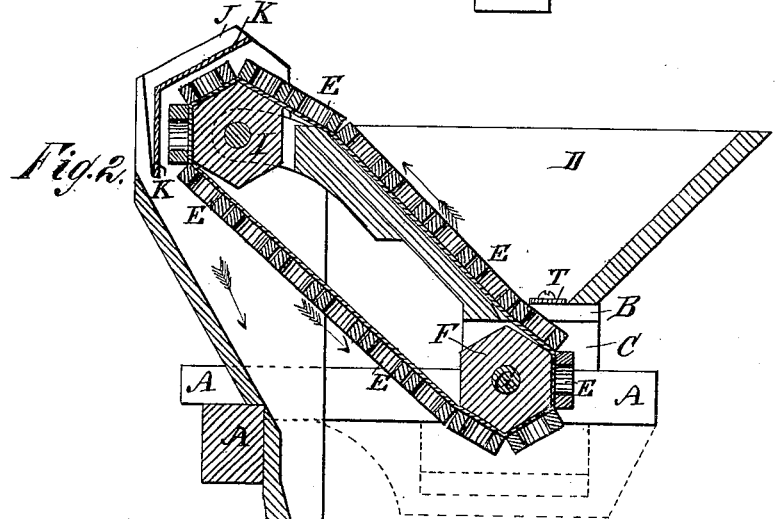

Figure 1 is a plan view of our improvement. Fig. 2 is a sectional side elevation of the same, taken through the line $x\ x$, Fig. 1. Fig. 3 is a side elevation of a part of the same, showing the three-armed wheel and the inclines that operate it.

The object of our invention is to improve the construction of the corn-planters for which Letters Patent were allowed February 5, 1881, in such a manner as to make it more convenient and reliable in use.

The invention consists in the combination, with the seed-box, the guide-spout, and the reciprocating slide, of the endless chain of seed-dropping blocks, the hexagonal pulleys, the shaft, the three-armed wheel, and the two inclines attached to the slide, whereby the said endless chain of blocks is moved forward to drop the seed by the reciprocating movement of the said slide; also, in the combination, with the endless chain of seed-dropping blocks, the hexagonal pulley, and the seed-guiding spout, of the angular plate, whereby the seed is kept in the cavities of the blocks until the said blocks are passing beneath the said pulleys; and, also, in the combination, with the guide-spout having a slot in the lower end, and the furrow-opening shoe having a hooked slot in its upper edge, of the rivet or bolt and the wedge-key, whereby the said shoe is secured in place detachably, as will be hereinafter fully described.

In the accompanying drawings, A represents the frame of the planter or bars attached to the said frame.

B is a cross-plate attached to the longitudinal bars A, and raised to a proper height above the said bars A by blocks C, interposed between its ends and the said bars A.

To the plate B is attached the seed-hopper D, the bottom of which is slotted for the passage of the endless chain of seed-dropping blocks E, in each of which is formed a cavity of such a size as to receive enough seed for a hill. The blocks E are attached to a flexible belt or chain, or are hinged to each other. The endless chain of seed-dropping blocks E passes around a hexagonal pulley, F, placed beneath the bottom of the hopper D and attached to a shaft, G, which revolves in bearings in the side bars, A. The upper part of the endless chain of seed-dropping blocks E passes up the inclined forward side of the seed-box D between two guide-bars, H, attached to the said inclined side, and passes around a hexagonal pulley, I, pivoted in the upper part of the spout J, that conducts the seed to the ground, and which is securely attached to the frame A. The sides of the spout J rise above the pulley I and blocks E, passing around the said pulley, and have grooves formed in their inner surfaces to receive the side edges of the angular plate K. The angle of the plate K corresponds with the angle of the pulley I, and the said plate is placed at the forward and upper sides of the said pulley, as shown in Fig. 2, the groove in which the said plate works being so formed that the upper part of the plate can rise to allow any kernels that may project above the block E to pass without being crushed. By this arrangement the seed is kept in the cavities of the blocks E until the said blocks have passed the forward side of the pulley I and begin to pass beneath the said pulley, so that the seed in the cavity of each block will be dropped at once to form a hill.

In the forward part of the lower end of the spout K is formed a slot, L, to receive the rear end of the runner-shaped shoe M. In the upper rear part of the shoe M is formed a hooked slot, N, to receive a rivet or bolt, O, attached to the spout J at the opposite sides of the slot L. The rear end of the shoe M is inclined or beveled, as shown in Fig. 2, to allow the said shoe to be detached from the rivet O by having its forward end raised. The shoe M is secured in place by a wedge-key, P, driven into the upper part of the slot L along the upper edge of the shoe M, as shown in Fig. 2.

To one end of the shaft G is attached a three-armed wheel, Q, with the arms of which engage the inclined bars R, attached to the plate S, which slides in ways attached to the frame A, and is operated by a hand-lever, or by any of the means ordinarily employed to operate a seed-dropping slide. The inclined bars R are so arranged that when the sliding bar S is moved in one direction one of the said inclines R will strike an arm of the wheel Q and revolve the said wheel and its shaft G through one-sixth of a revolution, leaving the arm operated upon in such a position that it will be struck by the other incline R as the plate S is moved in the other direction, and will be turned through a sixth of a revolution, and will move the endless chain of seed-dropping blocks E through the space of one block, and thus drop seed for a hill.

With this construction a number of the seed-dropping blocks E are constantly passing up the inclined side of the hopper D, and being filled with seed so as to insure a regular and uniform dropping of the seed. To the rear part of the bottom of the hopper D is attached a plate, T, to prevent any seed from escaping through the slot in the said bottom through which the seed-dropping blocks enter the said hopper.

Having thus described our invention, we claim as new and desire to secure by Letters Patent—

1. In a corn-planter, the combination, with the seed-box D, the spout J, and the slide S, of the endless chain of seed-dropping blocks E, the hexagonal pulleys F I, the shaft G, the three-armed wheel Q, and the two inclines R, substantially as herein shown and described, whereby the said endless chain of blocks is moved forward to drop the seed by the reciprocating movement of the said slide, as set forth.

2. In a corn-planter, the combination, with the endless chain of seed-dropping blocks E, the hexagonal pulley I, and the seed-guiding spout J, of the angular plate K, substantially as herein shown and described, whereby the seed is kept in the cavities of the blocks until the said blocks are passing beneath the said pulley, as set forth.

3. In a corn-planter, the combination, with the guide-spout J, having slot L in its lower end, and the furrow-opening shoe M, having hooked slot N, of the rivet or bolt O and the wedge key P, substantially as herein shown and described, whereby the said shoe is secured to the said spout detachably, as set forth.

THOMAS JEFFERSON LINDSAY.
WILLIAM JEFFERSON MINER.

Witnesses:
D. A. LINDSAY,
ELIJAH OSBURN.